United States Patent
Kedalagudde et al.

(10) Patent No.: US 11,856,457 B2
(45) Date of Patent: *Dec. 26, 2023

(54) VIRTUALIZED NETWORK FUNCTION MANAGEMENT

(71) Applicant: Apple Inc., Cupertino, CA (US)

(72) Inventors: Meghashree Dattatri Kedalagudde, Hillsboro, OR (US); Joey Chou, Scottsdale, AZ (US); Muthaiah Venkatachalam, Beaverton, OR (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/323,505

(22) PCT Filed: Aug. 5, 2015

(86) PCT No.: PCT/US2015/043826
§ 371 (c)(1),
(2) Date: Jan. 3, 2017

(87) PCT Pub. No.: WO2016/022698
PCT Pub. Date: Feb. 11, 2016

(65) Prior Publication Data
US 2017/0150399 A1 May 25, 2017

Related U.S. Application Data

(60) Provisional application No. 62/034,707, filed on Aug. 7, 2014, provisional application No. 62/037,998, filed on Aug. 15, 2014.

(51) Int. Cl.
*H04W 28/088* (2023.01)
*H04L 43/16* (2022.01)
(Continued)

(52) U.S. Cl.
CPC ....... *H04W 28/088* (2023.05); *H04L 41/0896* (2013.01); *H04L 43/16* (2013.01);
(Continued)

(58) Field of Classification Search
CPC ..... H04W 28/08; H04W 24/08; H04W 72/04; H04L 43/16
(Continued)

(56) References Cited

U.S. PATENT DOCUMENTS

| 8,799,431 | B2 * | 8/2014 | Pabari | G06F 9/5072 |
| | | | | 709/224 |
| 9,769,694 | B2 * | 9/2017 | Chou | H04W 28/0226 |
| 2013/0061219 | A1 * | 3/2013 | Jerbi | G06F 21/577 |
| | | | | 718/1 |

(Continued)

FOREIGN PATENT DOCUMENTS

| JP | 2013-239913 A | 11/2013 |
| KR | 10-2013-0036598 A | 4/2013 |

(Continued)

OTHER PUBLICATIONS

International Search Report and Written Opinion received for International Application No. PCT/US2015/043826, dated Nov. 13, 2015, 14 pages.

(Continued)

*Primary Examiner* — Chi Tang P Cheng
(74) *Attorney, Agent, or Firm* — Fay Kaplun & Marcin, LLP

(57) ABSTRACT

Briefly, in accordance with one or more embodiments, virtualized network function resources may be managed in a network. Performance measurements may be received for at least one mobility management entity (MME) in an MME pool, or for other network elements. If at least one of the performance measurements exceeds at least one predetermined threshold, instantiation of a new mobility management entity virtual network function (MME VNF) may be (Continued)

requested, and the MME VNF may be instantiated in response to the request. One or more user equipment (UE) devices managed by the MME pool may be connected to the added MME VNF.

14 Claims, 9 Drawing Sheets

(51) Int. Cl.

| | | |
|---|---|---|
| *H04L 41/0896* | (2022.01) | |
| *H04W 24/08* | (2009.01) | |
| *H04W 72/04* | (2023.01) | |
| *H04L 43/0876* | (2022.01) | |
| *H04L 43/0817* | (2022.01) | |

(52) U.S. Cl.
CPC .......... *H04W 24/08* (2013.01); *H04W 72/04* (2013.01); *H04L 43/0817* (2013.01); *H04L 43/0876* (2013.01)

(58) Field of Classification Search
USPC ........................................................ 370/252
See application file for complete search history.

(56) References Cited

U.S. PATENT DOCUMENTS

| | | |
|---|---|---|
| 2013/0121207 A1 | 5/2013 | Parker |
| 2013/0189951 A1 | 7/2013 | Lopez et al. |
| 2014/0155019 A1 | 6/2014 | Schwartz et al. |
| 2014/0200036 A1 | 7/2014 | Egner et al. |
| 2014/0313889 A1 | 10/2014 | Jeong et al. |
| 2015/0142958 A1 | 5/2015 | Tamura et al. |
| 2016/0335111 A1* | 11/2016 | Bruun ................. G06F 9/45558 |
| 2017/0070895 A1* | 3/2017 | Zhang .................. H04W 24/02 |

FOREIGN PATENT DOCUMENTS

| | | |
|---|---|---|
| WO | 2013016842 A1 | 2/2013 |
| WO | 2016/022698 A1 | 2/2016 |

OTHER PUBLICATIONS

CN Pubiication No. 106537842A, Invention Patent Gazette, vol. 33 No. 12 on Mar. 22, 2017, 4 pages:
Supplementary European Search Report for Application No. EP15830463, dated Jan. 17, 2018, 10 pages.
D. King, "Virtualisation of Mobile Core Network Use Case" XP015099466, Jun. 8, 2014, 14 pages.
Network Functions Virtualisation ISG; SW Architecture; Network Functions Classification, European Telecommunications Standards Institute (ETSI), vol. ISG-NFV, No. V0.0.13, Feb. 5, 2014 (Feb. 5, 2014),-Jan. 9, 2018 (Jan. 9, 2018), pp. 1-69, XPO14229627.
Notification of Publication received for Hong Kong Application No. 17107641.9, dated Feb. 12, 2018, issued as Publication No. HK 1234230 on Feb. 9, 2018, 4 pages including 3 pages of English translation.
International Preliminary Report on Patentability received for International Patent Application No. PCT/US2015/043826, dated Feb. 16, 2017, 11 pages.
Notice of Allowance received for European Patent Application No. 15830463.4 dated Nov. 12, 2018, 51 pages.
Intel, "pCR MME Overload Mitigation by MME VNF Procedure," document for approval, May 25-29, 2015, 4 pages, 3GPP TSG SA WG5 Meeting #101, Ljubljana, Slovenia.
Office Action received for Japanese Patent Application No. 2017-506662 dated Aug. 14, 2018, 6 pages including 3 pages of English translation.
Horikoshi, "Impact of NFV Changing the Future of Communications," Apr. 2014, pp. 20-33, vol. 603, Nikkei Communications.
Office Action received for Japanese Patent Application No. 2017-506662, dated Apr. 10, 2018, 7 pages including 4 pages of English translation.
Mehmet Ersue, "ETSI NFV Management and Orchestration—An Overview," paper, Nov. 3, 2013, 7 pages, IETF #88, Vancouver, Canada.
"Network Functions Virtualisation (NFV); Architectural Framework," 2013, 21 pages, 002 V1.1.1, ETSI GS NFV, Sophia Antipolis Cedex France.

* cited by examiner

VIRTUALIZED NETWORK FUNCTION MANAGEMENT

CROSS-REFERENCE TO RELATED APPLICATIONS

The present application claims the benefit of U.S. Provisional Application No. 62/034,707 filed Aug. 7, 2014 and the benefit of U.S. Provisional Application No. 62/037,998 filed Aug. 15, 2014. Said Application No. 62/034,707 and said Application No. 62/037,998 are hereby incorporated herein by reference in their entireties.

BACKGROUND

In networks operating in accordance with a Third Generation Partnership Project (3GPP) standard, load balancing and re-balancing of the Mobility Management Entity (MME) functions may be implemented to ensure that User Equipment (UE) entering into an MME Pool Area are directed an appropriate MME in a manner such that the UE-MME connections are evenly distributed among MMEs in the MME pool. Since the number of MMEs in the MME pool is static, an MME can be overloaded as the number of UEs entering the networks keeps rising. Overload control features of the MME utilize Non-Access Stratum (NAS) signaling to reject NAS requests from UEs which may result in service degradation to subscribers.

DESCRIPTION OF THE DRAWING FIGURES

Claimed subject matter is particularly pointed out and distinctly claimed in the concluding portion of the specification. However, such subject matter may be understood by reference to the following detailed description when read with the accompanying drawings in which:

Figure 1:
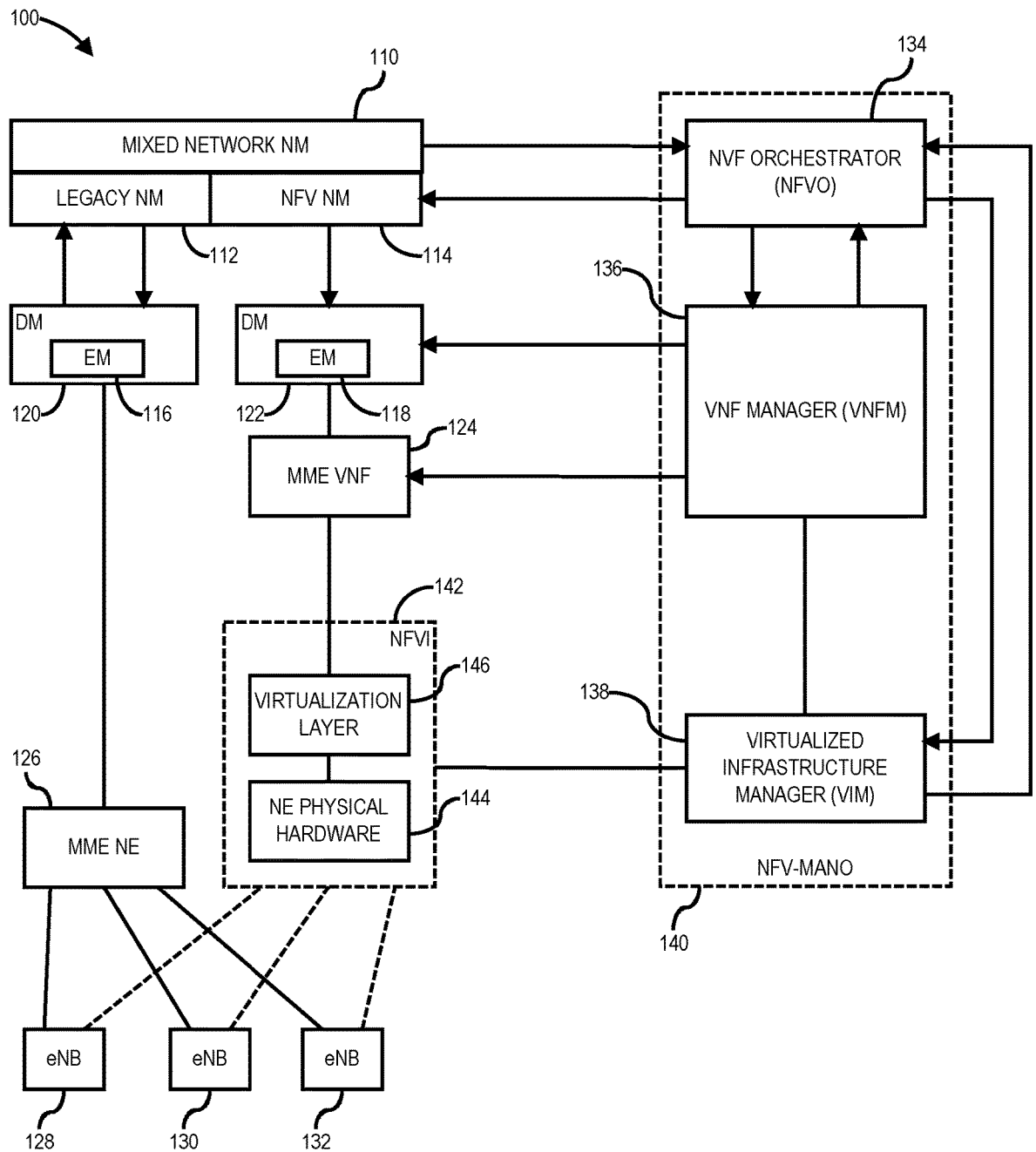
FIG. 1 is a diagram of a Mobility Management Entity (MME) virtualized network function (VNF) instantiation and termination in a mixed network in accordance with one or more embodiments.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. For example, "coupled" may mean that two or more elements do not contact each other but are indirectly joined together via another element or intermediate elements. Finally, the terms "on," "overlying," and "over" may be used in the following description and claims. "On," "overlying," and "over" may be used to indicate that two or more elements are in direct physical contact with each other. However, "over" may also mean that two or more elements are not in direct contact with each other. For example, "over" may mean that one element is above another element but not contact each other and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect. In the following description and/or claims, the terms "comprise" and "include," along with their derivatives, may be used and are intended as synonyms for each other.

Referring now to FIG. 1, a diagram of a Mobility Management Entity (MME) virtualized network function (VNF) instantiation and termination in a mixed network in accordance with one or more embodiments will be discussed. Although an MME VNF is discussed herein for purposes of example, other network elements of network 100 may be implemented as a virtualized network function in addition to an MME, for example a serving gateway (S-GW), packet data network gateway (P-GW), policy and charging rules function (PCRF), internet protocol multimedia subsystem (IMS), and so on, and the scope of the claimed subject matter is not limited in this respect. As shown in FIG. 1, network 100 may include a mixed network manager (NM) 110 comprising a legacy network manager (NM) 112 and a network functions virtualization (NFV) network manager (NM) 114. Mixed network manager 110 provides a package of end-user functions with the responsibility for the management of network 100 which may include network elements with virtualized network functions, managed by NFV NM 114, and non-virtualized network functions, managed by legacy NM 112, as supported by element managers such as element manager (EM) 116 and element manager (EM) 118 disposed in respective domain managers, domain manager (DM) 120 and domain manager (DM) 122. In some embodiments, mixed network manager (NM) 110 may also direct access to the Network Elements of network 100. In one or more embodiments, communication with network 100 may be based at least in part on standard interfaces and systems supporting multi-technology Network Elements, although the scope of the claimed subject matter is not limited in this respect.

In one or more embodiments, network 100 may operate in compliance with a Third Generation Partnership Project (3GPP) standard to provide a 3GPP SA5 management framework and with European Telecommunication Standards Institute (ETSI) standard such as network functions virtualization (NVF) Management and Orchestration (MANO) standard to support lifecycle management to instantiate, terminate, scale in, scale out, scale up, and/or scale down one or more virtualized network function (VNF) instances dynamically according to demand and/or for load balancing. As discussed herein, instantiation means starting or running a virtual machine that is capable of implementing a virtualized network function (VNF) such as a VNF for a mobility management entity (MME) of network 100, and termination means to close or to stop running such a virtual machine. As discussed herein, scaling out means adding or running one or more additional virtual machines capable of implementing a VNF in addition to one or more virtual machines already operating on network 100, that is increasing the number of virtual machines running on network 100, and scaling in means removing or stopping running one or more such virtual machines, that is reducing the number of virtual machine running network 100. As discussed herein, scaling up means adding one or more hardware resources, such as computing, memory, storage, and/or networking resources to support one or more virtual machines running on network 100, and scaling down means removing one or more such hardware resources from supporting one or more virtual machines running on network 100. These are merely example definitions, however, and other variations or definitions likewise may be provided as discussed herein and/or as understood by one of skill in the art, and the scope of the claimed subject matter is not limited in these respects.

As shown in FIG. 1, a mobility management entity (MME) virtualized network function (VNF) 124 may be instantiated or terminated in network 100 using mixed network NM 110 where a non-virtualized MME Network Element (MME NE) may be collocated in the same MME pool as MME VNF, for example before networks that implement NVF are fully deployed. As shown in FIG. 1, MME VNF 124 may be instantiated in network 100 where a non-virtualized MME, MME NE 126, is collocated with MME VNF 124 and aligned with VNF instantiation flow, for example in accordance with a European Telecommunication Standards Institute (ETSI) standard such as network functions virtualization (NVF) Management and Orchestration (MANO), although the scope of the claimed subject matter is not limited in this respect. In such an arrangement, following actions may be performed. It is noted that one particular order and number of actions described below are discussed for purposes of example, but other orders and numbers of actions may be implemented, and the scope of the claimed subject matter is not limited in these respects. Legacy NM 112 of mixed network MN 110 receives the measurements of MME processor usage and S1-MME data volume, for example according to a 3GPP specification, of the non-virtualized MME, MME NE 126, from EM 116. It is noted that MME NE 126 may be managing one or more evolved Node B (eNB) network elements, such as eNB 128, eNB 130, and/or eNB 132, which in turn may be serving one or more user equipment (UE) network elements (not shown), which may present the measured MME processor usage and S1-MME data volume to MME NE 126 based on the usage and loading from the various eNBs and/or UEs. Mixed network NM 110 sends a request to NVF orchestrator (NFVO) 134 to instantiate a new MME VNF, such as MME VNG 124, when mixed network NM 110 detects that the MME processor usage or S1-MME data volume counters are above one or more predetermined thresholds. In an alternative embodiment, mixed network NM 110 may forward the measurements to NFVO 134 and let NFVO 134 make the decision on when a new MME VNF should be instantiated.

In one or more embodiments, NFVO 134, VNF Manager 136, and Virtualized Infrastructure Manager (VIM) 138 may be part of NFV Management and Orchestration (NFV-MANO) 140 in accordance with an ETSI standard, although the scope of the claimed subject matter is not limited in this respect. In such embodiments, VIM 138 may couple to NFV Infrastructure (NFVI) 142 which comprises Network Element physical hardware 144 and Virtualization Layer 146. Network Element physical hardware 144 may comprise compute and/or processing hardware, storage hardware, and/or networking hardware, for example realized by one or more commercial off the shelf (COTS) servers or the like. Virtualization layer 146 may comprise virtualization software running on Network Element physical hardware 144, for example virtual machine management software and/or hypervisor software. MME VNF 124 may comprise software or instructions running on Network Element physical hardware 144 that is managed by virtualization layer 146. It should be noted that these are merely example implementations of NFVI 142 and MME VNF 124, and the scope of the claimed subject matter is not limited in these respects.

NFVO 134 validates the request by checking sender authorization and/or instantiation parameters, and may run a feasibility check. If the request is validated successfully, NFVO 134 calls VNF manager (VNFM) 135 to instantiate MME VNF 124. VNFM 136 validates the request and processes the instantiation parameters. VNFM 136 then sends a request to NFVO 134 for resource allocation. NFVO 134 executes any needed resource pre-allocation, and then sends a request to virtualized infrastructure manager (VIM) 138 for resource allocation. For example, if MME processor usage counter is above a predetermined threshold, VIM 138 allocates more computing and storage resources. If the S1-MME data volume counter is above a predetermined threshold, VIM 138 allocates more networking capacity.

In response to a request for resource allocation, VIM 138 allocates the requested computing, storage and/or networking resources, and sends an acknowledgement to NFVO 134. NFVO 134 sends an acknowledgement to VNFM 136 to indicate the completion of resource allocation. VNFM 136 then instantiates MME VNF 124, and configures MME VNF 124 with any MME VNF specific lifecycle parameters. VNFM 136 notifies EM 118 of new MME VNF 124. EM 118 then configures MME VNF 136 with information required for MME operation. VNFM 136 acknowledges the completion of instantiation of MME VNF 124 back to NFVO 134. NFVO 134 acknowledges the completion of instantiation of MME VNF 124 to mixed network NM 110. Mixed network NM 110 configures EM 116 of non-virtualized MME, MME NE 126, and EM 118 of MME VNF 124, by adding new MME VNF 124 to the MME pool, and informing MME NE 126 about the new MME VNF 124. MME NE 26 then will offload UEs in the ECM-CONNECTED mode to MME VNF 124 by initiating an S1 Release procedure with release cause "load balancing TAU required", for example according to a 3GPP specification, that will request the UE to perform tracking area update to connect to MME VNF 124, although the scope of the claimed subject matter is not limited in this respect.

In one or more embodiments, MME VNF 124 may be terminated in a mixed network, network 100 of FIG. 1, and may be aligned with VNF instance termination in NFV MANO 140 by implementing the following processes. Mixed network NM 110 receives the measurements of MME processor usage and data volume counters of non-virtualized MME, MME NE 126, and MME VNF 124 from EM 116 and EM 118. Mixed network NM 110 determines that MME VNF 124 may be terminated from analyzing the MME processor usage or data volume measurements of both MME NE 126 and MME VNF 124, and sends a request to NFVO 134 to initiate termination of MME VNF 124. In an alternative embodiment, mixed network NM 110 may forward the measurements to NFVO 134 and let NFVO 134 make the decision on when MME VNF 124 should be terminated. NFVO 134 validates the request by checking sender authorization, and verifying the existence of the instance of MME VNF 124. If the request is validated successfully, NFVO 134 will call VNFM 136 to terminate the instance of MME VNF 124. VNFM 136 sends a request to MME VNF 124 to terminate the VNF instance. In response, MME VNF 124 offload UEs in the ECM-CONNECTED mode to MME NE 126 by initiating the S1 Release procedure with release cause "load balancing TAU required" that will request the UE to perform tracking area update to connect to MME NE 126. After all UEs are offloaded to MME NE 126, MME VNF 124 sends a notification to VNFM 136 to indicate that the MME VNF instance has been terminated. VNFM 136 sends an acknowledgement to NFVO to indicate the completion of termination of the instance of MME VNF 136. NFVO 134 sends a request to VIM 138 to release the resources. VIM 138 deletes the networking, computing, and/or storage resources, and sends an acknowledgement to NFVO 134 to indicate the completion of resource de-allocation. NFVO 134 acknowledges the completion of MME VNF instance termination to mixed network NM 110. Mixed network NM 110 configures EM 116 of MME NE 126 and EM 118 of MME VNF 124 that the MME VNF instance has been terminated.

Figure 2:
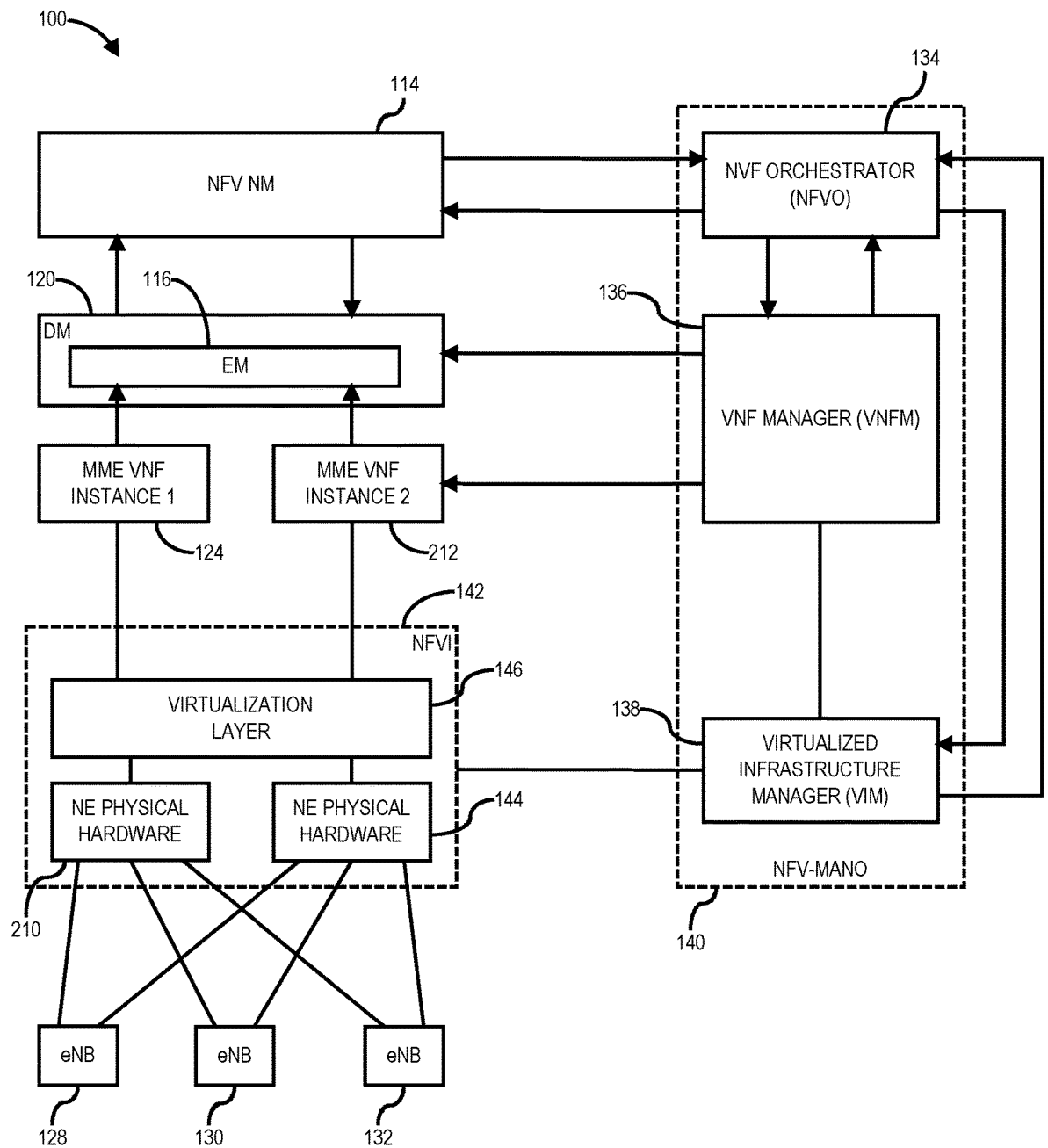
FIG. 2 is a diagram of a Mobility Management Entity (MME) virtualized network function (VNF) instance scaling out and in, or up and down, in accordance with one or more embodiments.

Referring now to FIG. 2, a diagram of a Mobility Management Entity (MME) virtualized network function (VNF) instance scaling out and in, or up and down, in accordance with one or more embodiments will be discussed. The embodiment shown in FIG. 2 illustrates how an instance of mobility management entity virtualized network function (MME VNF) 124 can be scaled out when network functions virtualization network manager (NFV NM) 114 detects that the instance of MME VNF 124 is overloaded via the threshold crossing events, for example MME VNF processor usage or data volume counters, and is aligned with VNF instance scaling flow in ETSI NFV-MANO 140. To minimize the impacts to the existing 3GPP management frameworks, in such an embodiment it may be assumed that the instance of MME VNF 124 scaling is triggered when NFV NM 114 detects that VNF processor usage or data volume counters are above one or more predetermined thresholds.

In one or more embodiments, scaling out of an instance of MME VNF 124 may be as follows. A first instance, MME VNF (instance 1) 124, may embed a monitor function to measure VNF performance and sends the measurements to element manager (EM) 116. EM 116 receives the measurements, such as MME VNF processor usage and/or data volume counters, and converts the measurements into the Type-2 message format that are sent to NFV NM 114. NFV NM 114 sends a request to NFVO 134 to scale out a new MME VNF instance, for MME VNF (instance 2) 212, when NFV NM 114 detects that the measurements are above one or more predetermined thresholds. In an alternative embodiment, NFV NM 114 may decide to forward the measurements to NFVO 134 and let NFVO 134 make the decision on when to scale out an MME VNF instance. NFVO 134 validates the request against policy conformance. If the request is validated successfully, NFVO 134 sends the scaling out request to VNFM 136. VNFM 136 executes any involved preparation work, and then sends a request to NFVO 134 to allocate resources to support the new MME VNF instance, MME VNF (instance 2) 212. NFVO 134 executes any needed resource pre-allocation, and then sends a request to VIM 138 for resource allocation. VIM 138 allocates the requested computing, storage and/or networking resources, and sends an acknowledgement to NFVO 134. NFVO 134 sends an acknowledgement to VNFM 136 to indicate the completion of resource allocation.

VNFM 136 instantiates MME VNF (instance 2) 212, and configures MME VNF (instance 2) with any MME VNF specific lifecycle parameters. VNFM 136 notifies EM 116 of the new MME VNF (instance 2) 212. EM 116 then configures the MME VNF (instance 2) 212 with information required for MME VNF instance operation. VNFM 136 acknowledges NFVO 134 that the instantiation of MME VNF (instance 2) 212 has been completed. NFVO 134 acknowledges NFV NM 134 that the instantiation of MME VNF (instance 2) 212 has been completed. NFV NM 134 configures EM 116 by adding the new MME VNF (instance 2) 212 to the MME pool, and informing MME VNF (instance 1) 124 about the new the MME VNF (instance 2) 212. MME VNF (instance 1) 124 will offload UEs in the ECM-CONNECTED mode to MME VNF (instance 2) 212 by initiating the S1 Release procedure with release cause "load balancing TAU required" that will request the UE to perform tracking area update to connect to the MME VNF (instance 2) 212.

In another embodiment, a MME VNF instance may be scaled in when NFV NM 114 detects that MME VNF instances are not overloaded via the notification of threshold crossing events, for example MME VNF processor usage and/or data volume counters, and is aligned with the VNF instance scaling flow in ETSI NFV-MANO 140. A process for MME VNF instance scaling in may be as follows. MME VNF (instance 1) 124 and MME VNF (instance 2) 212 may embed a monitor function to measure the VNF performance and send the measurements to EM 116. EM 116 receives the measurements such as MME VNF processor usage and/or data volume counters, and converts the measurements into the Type-2 message format that are sent to NFV NM 114. NFV NM 114 sends a request to NFVO 134 to scale in MME VNF (instance 2) 212 when it detects that the measurements are below one or more predetermined thresholds, and a single MME VNF instance is capable of supporting the UEs of network 100. In an alternative embodiment, NFV NM 114 may forward the measurements to NFVO 134 and let NFVO 134 make the decision on when to scale in a MME VNF. NFVO 134 validates the request against policy conformance. If the request is validated successfully, NFVO 134 sends the scaling in request to VNFM 136. VNFM 136 sends a request to MME VNF (instance 2) 212 to remove MME VNF (instance 2) 212. MME VNF (instance 2) 212 offloads UEs in the ECM-CONNECTED mode to MME VNF (instance 1) 124 by initiating the S1 Release procedure with release cause "load balancing TAU required" that will request the UE to perform tracking area update to connect to MME VNF (instance 1) 124. MME VNF (instance 2) 212 detects that all UEs are offloaded to MME VNF (instance 1) 124, and sends a notification to VNFM 136 to indicate that the MME VNF (instance 2) 212 has been removed. VNFM 136 sends an acknowledgement to NFVO 134 to indicate the completion of removal of MME VNF (instance 2) 212. NFVO 134 sends a request to VIM 138 to release the resources associated with MME VNF (instance 2) 212. VIM 138 deletes the network connections, computing, and/or storage resources, and sends an acknowledgement to NFVO 134 to indicate the completion of resource de-allocation. NFVO 134 acknowledges the completion of removal of MME VNF (instance 2) 212 to NFV NM 114. NFV NM 114 configures EM 116 that MME VNF (instance 2) 212 has been terminated.

In one or more embodiments, an MME VNF instance may scale up and down the resources according to the need of a MME VNF to serve UE connecting to networks 100. Such an arrangement is aligned with the VNF instance scaling flow in ETSI NFV-MANO 140. To minimize the impacts to the existing 3GPP management frameworks, in one or more embodiments the MME VNF instance scaling may be triggered when NFV NM 114 detects that VNF processor usage and/or data volume counters are above or below predetermined thresholds. A process for MME VNF instance scaling up and down may be as follows. MME VNF 124 embeds a monitor function to measure the VNF performance, and then sends the measurements to EM 116. EM 116 receives the VNF measurements, for example MME VNF processor usage and/or data volume counters, and converts them into Type-2 message format that are sent to NFV NM 114. NFV NM 114 sends a request to NFVO 134 to scale up or scale down the VNF resources when NFV NM 114 detects the measurements are above or below one or more predetermined thresholds, respectively. In an alternative embodiment, NFV NM 114 may decide to forward the measurements to NFVO 134 and let NFVO 134 make the decision on when to scale up or down an MME VNF such as MME VNF (instance 1) 124. NFVO 134 validates the request against policy conformance. If the request is validated successfully, NFVO 134 sends the scaling request to VNFM 136. VNFM 136 executes any needed preparation work, then sends a request to NFVO 134 for resource allocation. NFVO 134 sends a request to VIM 138 to allocate or release. For example, if the measurements are above a predetermined threshold, VIM 138 increases networking, computing and/or storage resources. If the measurements are below a predetermined threshold, VIM 138 will reduce networking, computing and/or storage resources. The thresholds should be set properly to prevent a ping-pong effect of scaling up and down when at or near a threshold. For example, a threshold to increase resources may have a different value tan the threshold to decrease resources, although the scope of the claimed subject matter is not limited in this respect.

VIM 138 increases or reduces the networking, computing, and storage resources of MME VNF 124, according to the scaling up or down request, respectively, and sends an acknowledgement to NFVO 134. NFVO 134 sends an acknowledgement to VNFM 136 to indicate the completion of resources adjustment. VNFM 136 configures MME VNF 124 according to the scaling request. VNFM 136 acknowledges the completion of MME VNF instance scaling up/down back to NFVO 134. NFVO 134 acknowledges the completion of MME VNF instance scaling up/down to NFV NM 114. NFV NM 114 configures EM 116 with the adjusted resources for MME VNF 124. MME VNF 124 will update all eNBs such as eNB 128, eNB 130, and/or eNB 132, which are connected to MME VNF 124 with the new weight factor according to the adjusted resources, via "Relative MME Capacity" IE in "MME CONFIGURATION UPDATE" message, for example according to a 3GPP specification, although the scope of the claimed subject matter is not limited in this respect.

Figure 3:
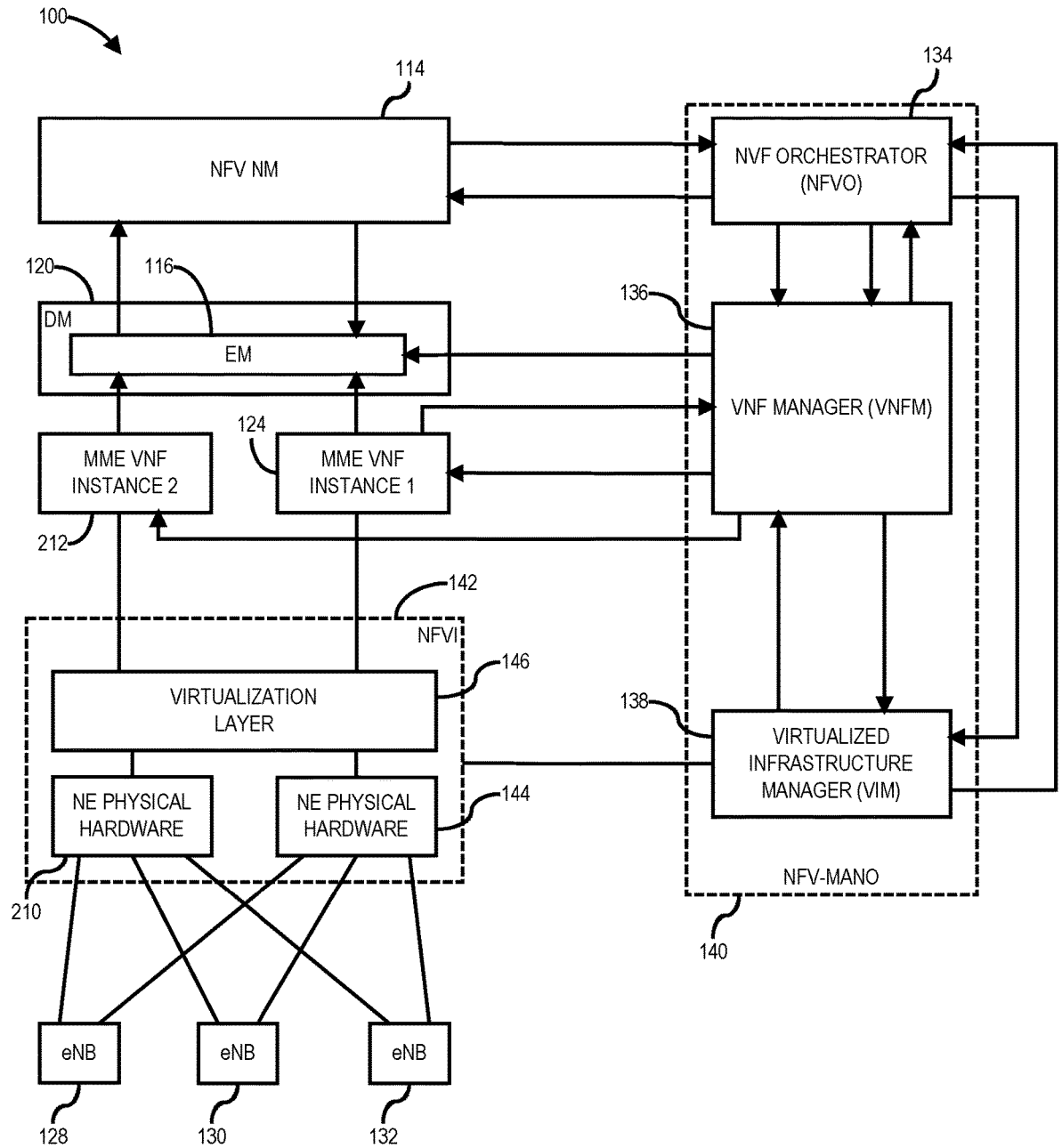
FIG. 3 is a diagram of virtualized network function (VNF) Manager (VNFM) initiated scaling out in accordance with one or more embodiments.

Referring now to FIG. 3, a diagram of virtualized network function (VNF) Manager (VNFM) initiated scaling out in accordance with one or more embodiments will be discussed. As shown in FIG. 1, MME VNF (instance 1) 124 may embed a monitor function to measure the VNF performance metrics, and send the measurements, for example MME VNF processor usage and/or data volume counter, to VNFM 136. VNFM 138 detects that the MME processor usage and/or volume counters are above one or more predetermined thresholds, and there is shortage of resources for which expansion may address the shortage. Based on the parameters provided in the VNF descriptor, for example memory parameters, computing parameters, and so on, VNFM 138 requests NFVO 134 permission for expansion. In an alternative embodiment, VNFM 138 may decide to forward the measurements to NFVO 134 and let NFVO 134 make the decision on when to scale out an instance of MME VNF. NFVO 134 checks for free resources against its database. If resources are available, NFVO 134 sends out an optional resource reservation request to VIM 138, and VIM 138 allocates the requested computing, storage and/or networking resources, and sends an acknowledgement to NFVO 134. NFVO 134 sends an acknowledgement to VNFM 136 to indicate the completion of resource allocation. VNFM 136 requests VIM 138 to start one or more virtual machines (VMs) as indicated by NFVO 134, for example VIM Identifiers, parameters for the virtual machines, and so on. VIM 138 acknowledges successfully running the VMs and other network resources. VNFM 136 instantiates the MME VNF (instance 2) 212, and configures MME VNF (instance 2) 212 with any MME VNF specific lifecycle parameters. VNFM 136 notifies EM 116 of the new MME instance, MME VNF (instance 2) 212. EM 212 then configures the MME VNF (instance 2) 212 with information required for MME VNF instance operation. VNFM 136 reports successful addition of a new MME VNF instance to NFVO 134. NFVO 134 updates its database with the new MME instance descriptor. EM 116 notifies NFV NM 114 of the new MME VNF (instance 2) 212. NFV NM 114 acknowledges the successful instantiation of the new MME VNF (instance 2) 212. EM 116 configures the MME VNF (instance 2) 212 with any application specific parameters. EM 116 notifies MME (instance 1) 124 about the new MME instance, MME VNF (instance 2) 212, added in the MME pool. MME VNF (instance 1) 124 will offload UEs in the ECM-CONNECTED mode to MME VNF (instance 2) 212 by initiating the S1 Release procedure with release cause "load balancing TAU required" that will request UEs connected to network 100 to perform tracking area update to connect to the MME VNF (instance 2) 212.

Figure 4:
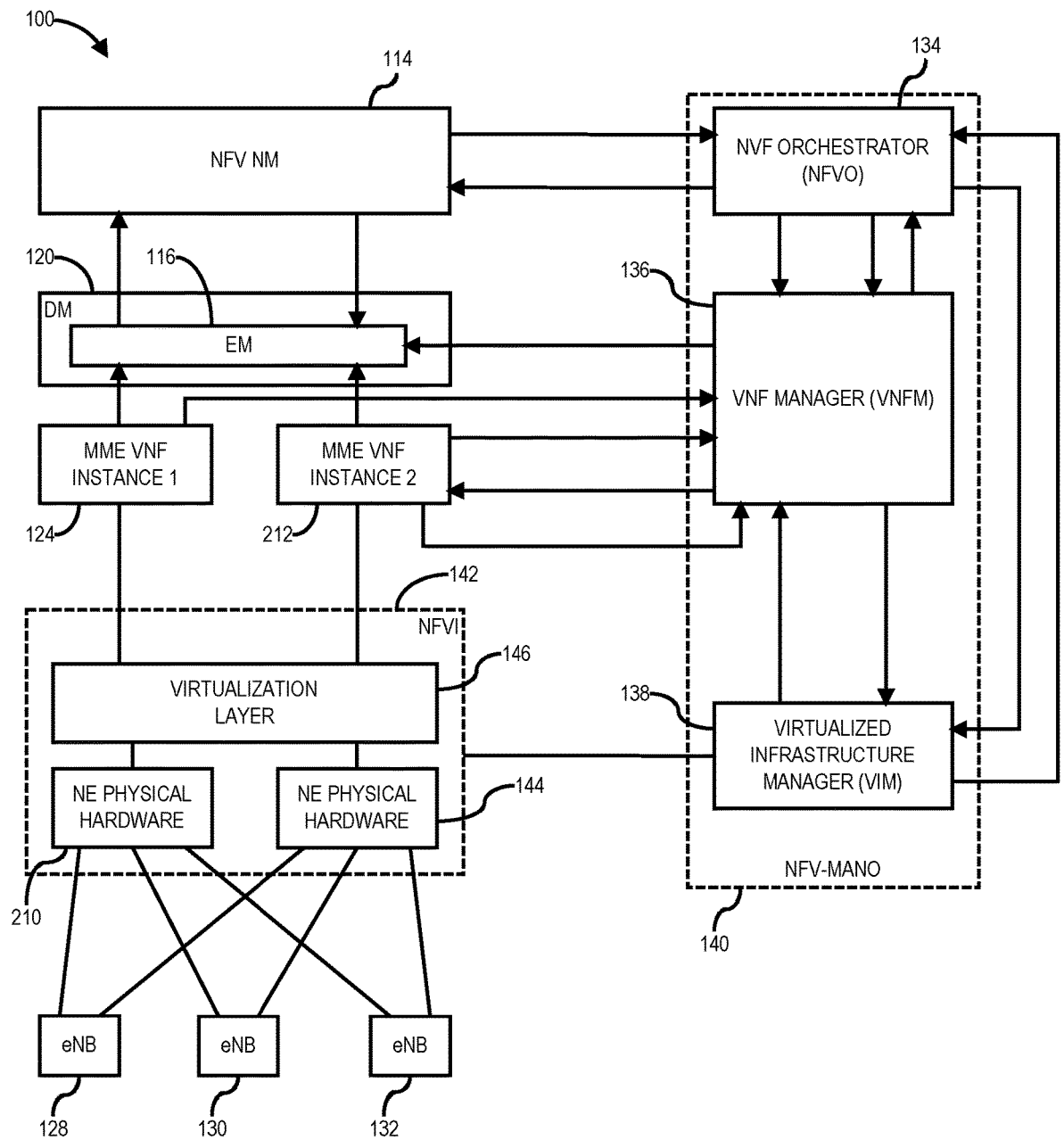
FIG. 4 is a diagram of virtualized network function (VNF) Manager (VNFM) initiated scaling in in accordance with one or more embodiments.

Referring now to FIG. 4, a diagram of virtualized network function (VNF) Manager (VNFM) initiated scaling in in accordance with one or more embodiments will be discussed. FIG. 4 illustrates how an MME VNF instance may be scaled in when VNFM 136 detects that the MME VNF instance is not sufficiently loaded to match the threshold crossing events, for example MME VNF processor usage and/or data volume counters, and is aligned with VNF instance scaling flow in ETSI NFV-MANO 140. The information involved to detect a need for scaling may be provided in the VNF descriptor. A process of VNFM 136 initiated scaling in may be as follows. MME VNF instances, MME VNF (instance 1) 124 and MME VNF (instance 2), may embed a monitor function to measure the VNF performance metrics, and send the measurements such as MME VNF processor usage and/or data volume counters to VNFM 136. VNFM 136 detects that the MME processor usage or data volume counters are below one or more predetermined thresholds, and there is a capacity to release resources which may allow scaling in/release of resources. Based on the parameters provided in the VNF descriptor, for example memory, computing, and so on, VNFM 136 requests NFVO 134 permission for scaling in. In an alternative embodiment, VNFM 136 may forward the measurements to NFVO 134, and NFVO 134 makes the decision on when to scale in a MME VNF. NFVO 134 checks for resources against its database, and grants the scaling in operation to VNFM 136. VNFM 136 sends a request to MME VNF (instance 2) 212 to remove the MME VNF instance. MME VNF (instance 2) 212 will offload UEs in the ECM-CONNECTED mode to MME VNF (instance 1) 124 by initiating the S1 Release procedure with release cause "load balancing TAU required" that will request the UEs to perform tracking area update to connect to MME VNF (instance 1) 124. After the UEs are offloaded to VNF (instance 1) 124 from VNF (instance 2) 212, VNF (instance 2) 212 sends a notification to indicate VNF (instance 2) 212 has been removed. After MME VNF (instance 2) 212 is completely shut down, VNFM 136 requests VIM 138 to delete all the associated resources. VIM 138 acknowledges removal of all the resources associated with the MME VNF (instance 2) 212. VNFM 136 reports successful completion of contraction/scaling in to NFVO 134. NFVO 134 updates its database to reflect the change. VNFM 136 notifies EM 116 on the removal of MME VNF (instance 2) 212. EM 116 in turn notifies NFV NM 114 of the removal of MME VNF (instance 2) 212. NFV NM 114 then acknowledges the changes.

Figure 5:
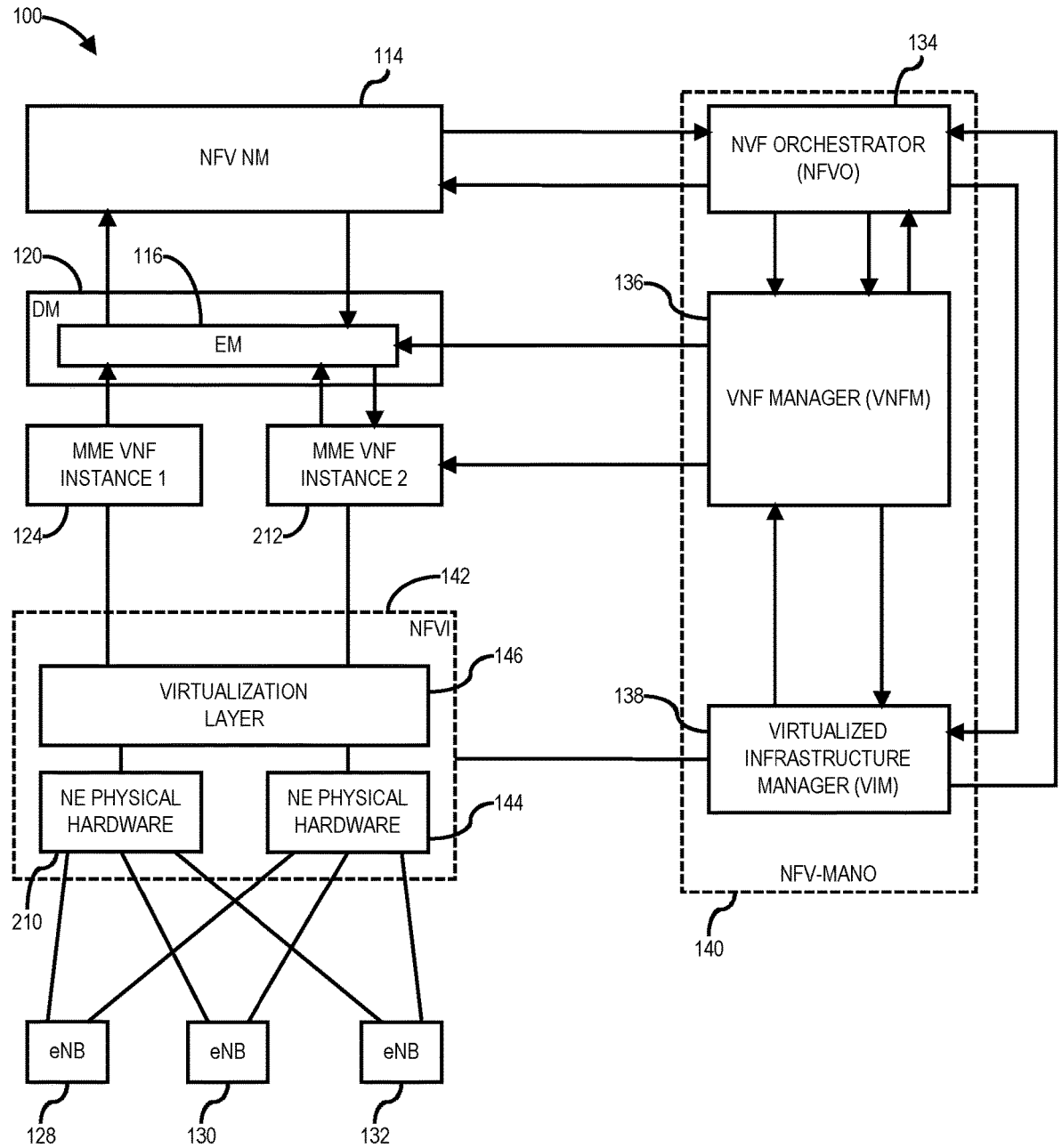
FIG. 5 is a diagram of EM initiated scaling out in accordance with one or more embodiments.

Referring now to FIG. 5, a diagram of element manager (EM) initiated scaling out in accordance with one or more embodiments will be discussed. FIG. 5 illustrates how an MME VNF instance may be scaled out when EM 116 detects that MME VNF (instance 1) 124 is overloaded via threshold crossing events, for example MME VNF processor usage and/or data volume counters, and is aligned with VNF instance scaling flow in ETSI NFV-MANO 140. EM 116 monitors the performance metrics and threshold detection if not supported in the MME VNF. In this case, the decision to scale may be taken at EM 116 and forwarded to VNFM 136. A process for EM initiated scaling out may be as follows. EM 116 receives performance measurements, for example MME VNF processor usage and/or data volume counters, from MME VNF (instance 1) 124. EM 116 detects that the MME processor usage and/or data volume counters are above one or more predetermined thresholds, and requests the scale out operation to VNFM 136. The decision to scale may be taken by EM 116 based on the performance metrics monitored. In an alternative embodiment, EM 116 may forward the measurements VNFM 136 which in turn sends the measurements to NFVO 134, and NFVO 134 makes the decision on when to scale out MME VNF to a new instance, and then request VNFM 136 to scale out a new instance. Based on the parameters provided in the VNF descriptor, such as memory, computing, and so on, VNFM 136 requests NFVO 134 permission for expansion. NFVO 134 checks for free resources against its database. NFVO 134 sends out an optional resource reservation request to VIM 138, and VIM 138 allocates the requested computing, storage and/or networking resources, and sends an acknowledgement to NFVO 134. NFVO 134 sends an acknowledgement to VNFM 136 to indicate the completion of resource allocation. VNFM 136 requests VIM 138 to start one or more virtual machines (VMs) as indicated by NFVO 134 for example using VIM Identifiers, virtual machine parameters, and so on. VIM 138 acknowledges successfully running the virtual machines and other network resources. VNFM 136 instantiates MME VNF (instance 2) 212, and configures MME VNF (instance 2) 212 with any MME VNF specific lifecycle parameters. VNFM 136 acknowledges to EM 116 of new MME VNF (instance 2) 212. EM 116 then configures MME VNF (instance 2) 212 with information involved for MME VNF instance operation. VNFM 126 reports successful addition of a new MME VNF instance, MME VNF (instance 2) 212, to NFVO 134. NFVO 134 updates its database with the new MME instance descriptor. EM 116 notifies NFV NM 114 of new MME VNF (instance 2) 212. NFV NM 114 acknowledges the successful instantiation of new MME VNF (instance 2) 212. EM 116 configures MME VNF (instance 2) 212 with any application specific parameters. EM 116 notifies MME VNF (instance 1) 124 about new MME VNF (instance 2) 212 added in the MME pool. MME VNF (instance 1) 124 will offload one or more UEs in the ECM-CONNECTED mode to MME VNF (instance 2) 212 by initiating the S1 Release procedure with release cause "load balancing TAU required" that will request the UEs to perform tracking area update to connect to MME VNF (instance 2) 212.

Figure 6:
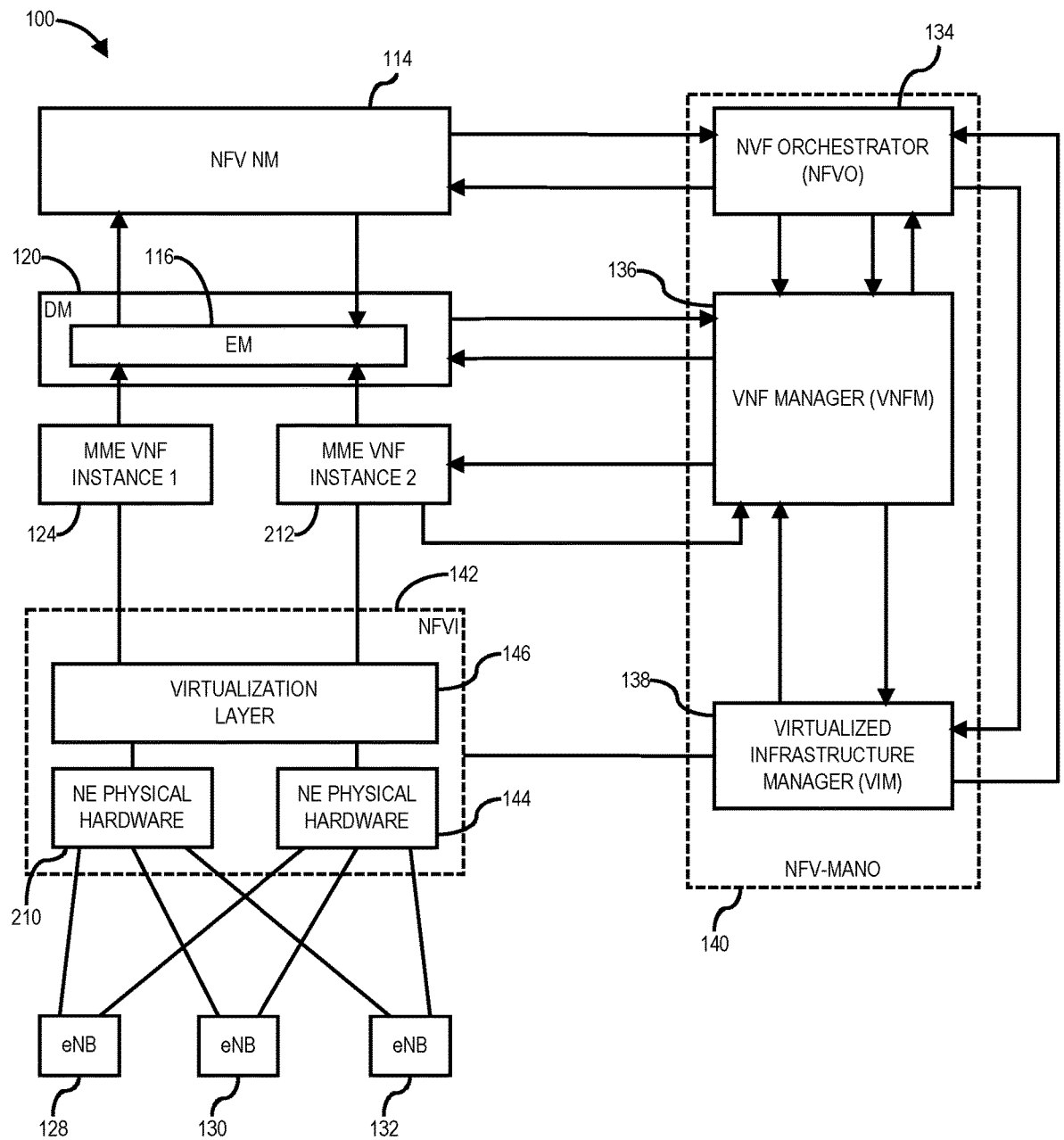
FIG. 6 is a diagram of EM initiated scaling in in accordance with one or more embodiments.

Referring now to FIG. 6, a diagram of element manager (EM) initiated scaling in in accordance with one or more embodiments will be discussed. FIG. 6 illustrates how an MME VNF instance can be scaled in when EM 116 detects that MME VNF (instance 2) 212 is not sufficiently loaded to match the threshold crossing events, for example MME VNF processor usage and/or data volume counters, and is aligned with VNF instance scaling flow in ETSI NFV-MANO 140. EM 116 monitors the performance metrics and threshold detection. In this case, the decision to scale is taken at EM 116 and forwarded to the VNFM 136. A process of EM initiated scaling in may be as follows. EM 116 monitors the performance metrics, for example MME VNF processor usage and/or data volume counters, and reports sent from the MME VNF instances MME VNF (instance 1) 124 and/or MME VNF (instance 2) 212, and makes a decision involved for scaling. EM 116 detects that the MME processor usage or data volume counters are below predetermined thresholds, and there and there is a capacity to release resources which may allow scaling in (release) of resources. EM 116 requests the scale in operation to VNFM 136. In an alternative embodiment, EM 116 may forward the measurements VNFM 136 which in turn sends the measurements to NFVO 134, and NFVO 134 makes the decision on when to scale in a MME VNF. Based on the parameters provided in the VNF descriptor, for example memory, computing, and so on, VNFM 136 requests NFVO 134 permission for scaling in. NFVO 134 checks for resources against its database, and NFVO 134 grants the scaling in operation to VNFM 136. VNFM 136 sends a request to MME VNF (instance 2) 212 to remove the MME VNF instance. MME VNF (instance 2) 212 will offload one or more UEs in the ECM-CONNECTED mode to MME VNF (instance 1) 124 by initiating the S1 Release procedure with release cause "load balancing TAU required" that will request the UE to perform tracking area update to connect to the MME VNF (instance 2) 124. After the UEs are offloaded to MME VNF (instance 1) 124 from MME VNF (instance 2) 212, MME VNF (instance 2) 212 sends a notification to indicate VNF (instance 2) 212 has been removed. Once MME VNF (instance 2) 212 is completely shut down, VNFM 136 requests VIM 138 to delete all the associated resources. VIM 138 acknowledges removal of all the resources associated with the MME VNF (instance 2) 212. VNFM 136 reports successful completion of contraction (scaling in) to NFVO 134. NFVO 134 updates its data base to reflect the change. VNFM 136 acknowledges EM 116 on the removal of MME VNF (instance 2) 212. EM 116 in turn notifies NFV NM 114 of the removal of MME VNF (instance 2) 212, and NFV NM 114 acknowledges the changes.

Figure 7:
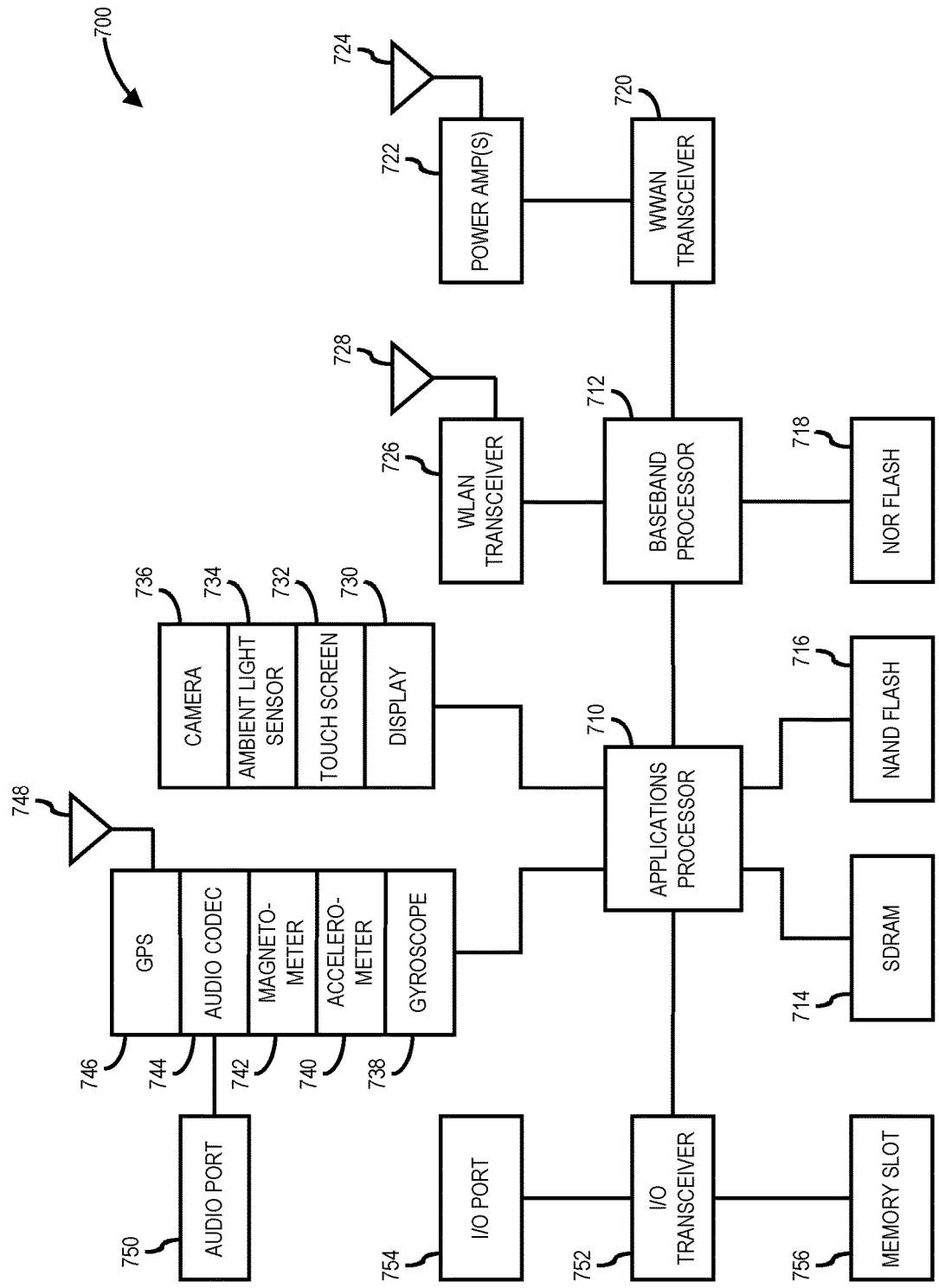
FIG. 7 is a block diagram of an information handling system capable implementing virtualized network management function in accordance with one or more embodiments.

Referring now to FIG. 7, a block diagram of an information handling system capable of implementing virtualized network function management accordance with one or more embodiments will be discussed. Information handling system 700 of FIG. 7 may tangibly embody any one or more of the elements described herein, above, including for example mixed network NM 110, DM 120, DM 122, NFVI 142, MME 126, eNB 18, eNB 130, eNB 132, and/or NFV-MANO 140, with greater or fewer components depending on the hardware specifications of the particular device. Although information handling system 700 represents one example of several types of computing platforms, information handling system 700 may include more or fewer elements and/or different arrangements of elements than shown in FIG. 7, and the scope of the claimed subject matter is not limited in these respects.

In one or more embodiments, information handling system 700 may include an application processor 710 and a baseband processor 712. Application processor 710 may be utilized as a general-purpose processor to run applications and the various subsystems for information handling system 700. Application processor 710 may include a single core or alternatively may include multiple processing cores wherein one or more of the cores may comprise a digital signal processor or digital signal processing (DSP) core. Furthermore, application processor 710 may include a graphics processor or coprocessor disposed on the same chip, or alternatively a graphics processor coupled to application processor 710 may comprise a separate, discrete graphics chip. Application processor 710 may include on board memory such as cache memory, and further may be coupled to external memory devices such as synchronous dynamic random access memory (SDRAM) 714 for storing and/or executing applications during operation, and NAND flash 716 for storing applications and/or data even when information handling system 700 is powered off. In one or more embodiments, instructions to operate or configure the information handling system 1100 and/or any of its components or subsystems to operate in a manner as described herein may be stored on a article of manufacture comprising a non-transitory storage medium. In one or more embodiments, the storage medium may comprise any of the memory devices shown in and described herein, although the scope of the claimed subject matter is not limited in this respect. Baseband processor 712 may control the broadband radio functions for information handling system 700. Baseband processor 712 may store code for controlling such broadband radio functions in a NOR flash 718. Baseband processor 712 controls a wireless wide area network (WWAN) transceiver 720 which is used for modulating and/or demodulating broadband network signals, for example for communicating via a 3GPP LTE or LTE-Advanced network or the like.

In general, WWAN transceiver 720 may operate according to any one or more of the following radio communication technologies and/or standards including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handyphone System (PHS), Wideband Integrated Digital Enhanced Network (WiDEN), iBurst, Unlicensed Mobile Access (UMA), also referred to as also referred to as 3GPP Generic Access Network, or GAN standard), Zigbee, Bluetooth®, and/or general telemetry transceivers, and in general any type of RF circuit or RFI sensitive circuit. It should be noted that such standards may evolve over time, and/or new standards may be promulgated, and the scope of the claimed subject matter is not limited in this respect.

The WWAN transceiver 720 couples to one or more power amps 742 respectively coupled to one or more antennas 724 for sending and receiving radio-frequency signals via the WWAN broadband network. The baseband processor 712 also may control a wireless local area network (WLAN) transceiver 726 coupled to one or more suitable antennas 728 and which may be capable of communicating via a Wi-Fi, Bluetooth®, and/or an amplitude modulation (AM) or frequency modulation (FM) radio standard including an IEEE 802.11 a/b/g/n standard or the like. It should be noted that these are merely example implementations for application processor 710 and baseband processor 712, and the scope of the claimed subject matter is not limited in these respects. For example, any one or more of SDRAM 714, NAND flash 716 and/or NOR flash 718 may comprise other types of memory technology such as magnetic memory, chalcogenide memory, phase change memory, or ovonic memory, and the scope of the claimed subject matter is not limited in this respect.

In one or more embodiments, application processor 710 may drive a display 730 for displaying various information or data, and may further receive touch input from a user via a touch screen 732 for example via a finger or a stylus. An ambient light sensor 734 may be utilized to detect an amount of ambient light in which information handling system 700 is operating, for example to control a brightness or contrast value for display 730 as a function of the intensity of ambient light detected by ambient light sensor 734. One or more cameras 736 may be utilized to capture images that are processed by application processor 710 and/or at least temporarily stored in NAND flash 716. Furthermore, application processor may couple to a gyroscope 738, accelerometer 740, magnetometer 742, audio coder/decoder (CODEC) 744, and/or global positioning system (GPS) controller 746 coupled to an appropriate GPS antenna 748, for detection of various environmental properties including location, movement, and/or orientation of information handling system 700. Alternatively, controller 746 may comprise a Global Navigation Satellite System (GNSS) controller. Audio CODEC 744 may be coupled to one or more audio ports 750 to provide microphone input and speaker outputs either via internal devices and/or via external devices coupled to information handling system via the audio ports 750, for example via a headphone and microphone jack. In addition, application processor 710 may couple to one or more input/output (I/O) transceivers 752 to couple to one or more I/O ports 754 such as a universal serial bus (USB) port, a high-definition multimedia interface (HDMI) port, a serial port, and so on. Furthermore, one or more of the I/O transceivers 752 may couple to one or more memory slots 756 for optional removable memory such as secure digital (SD) card or a subscriber identity module (SIM) card, although the scope of the claimed subject matter is not limited in these respects.

Figure 8:
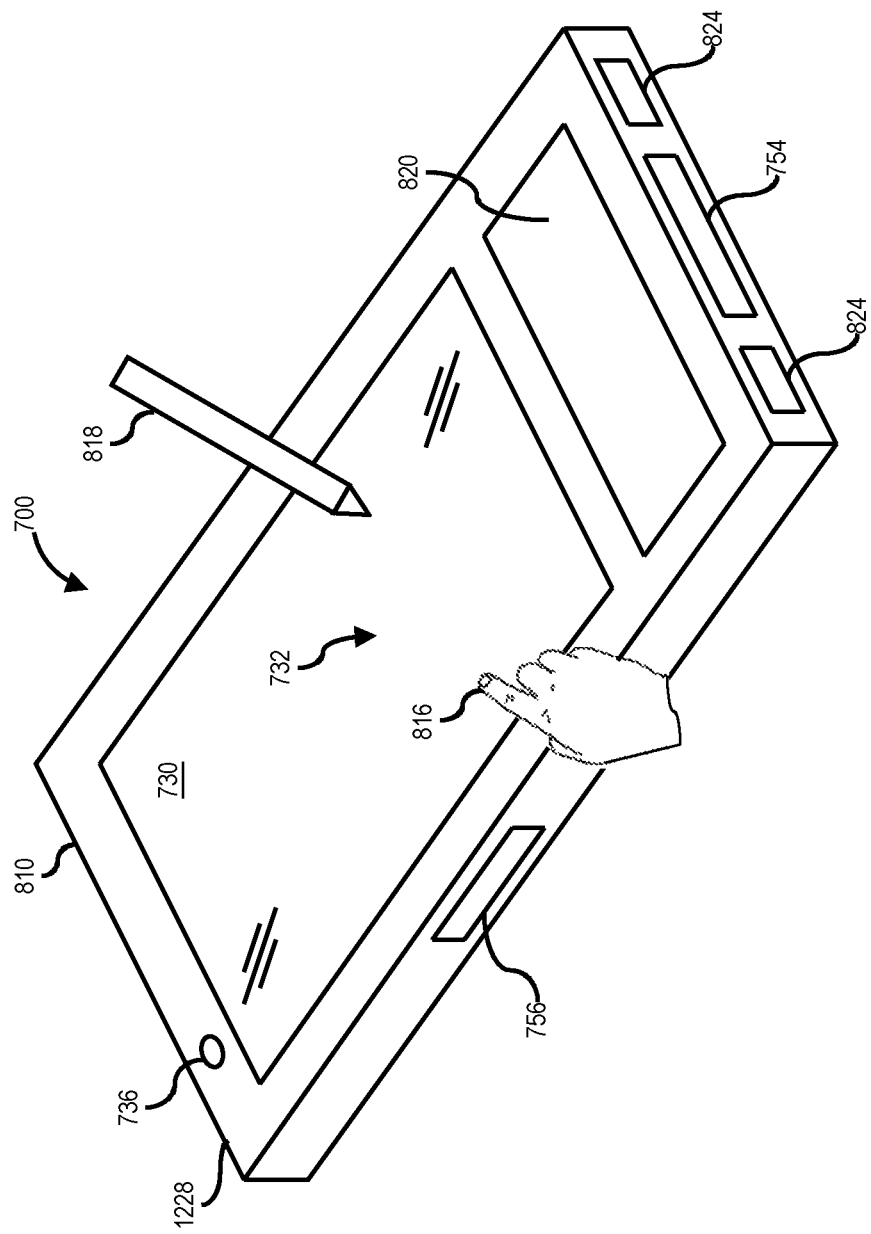
FIG. 8 is an isometric view of an information handling system of FIG. 7 that optionally may include a touch screen in accordance with one or more embodiments.

Referring now to FIG. 8, an isometric view of an information handling system of FIG. 7 that optionally may include a touch screen in accordance with one or more embodiments will be discussed. FIG. 8 shows an example implementation of information handling system 1100 of FIG. 7 tangibly embodied as a cellular telephone, smartphone, or tablet type device or the like. The information handling system 700 may comprise a housing 810 having a display 730 which may include a touch screen 732 for receiving tactile input control and commands via a finger 816 of a user and/or a via stylus 1218 to control one or more application processors 710. The housing 810 may house one or more components of information handling system 700, for example one or more application processors 710, one or more of SDRAM 714, NAND flash 716, NOR flash 718, baseband processor 712, and/or WWAN transceiver 720. The information handling system 700 further may optionally include a physical actuator area 820 which may comprise a keyboard or buttons for controlling information handling system via one or more buttons or switches. The information handling system 700 may also include a memory port or slot 756 for receiving non-volatile memory such as flash memory, for example in the form of a secure digital (SD) card or a subscriber identity module (SIM) card. Optionally, the information handling system 700 may further include one or more speakers and/or microphones 824 and a connection port 754 for connecting the information handling system 700 to another electronic device, dock, display, battery charger, and so on. In addition, information handling system 700 may include a headphone or speaker jack 828 and one or more cameras 736 on one or more sides of the housing 810. It should be noted that the information handling system 700 of FIG. 8 may include more or fewer elements than shown, in various arrangements, and the scope of the claimed subject matter is not limited in this respect.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. Embodiments described herein may be implemented into a system using any suitably configured hardware and/or software.

Figure 9:
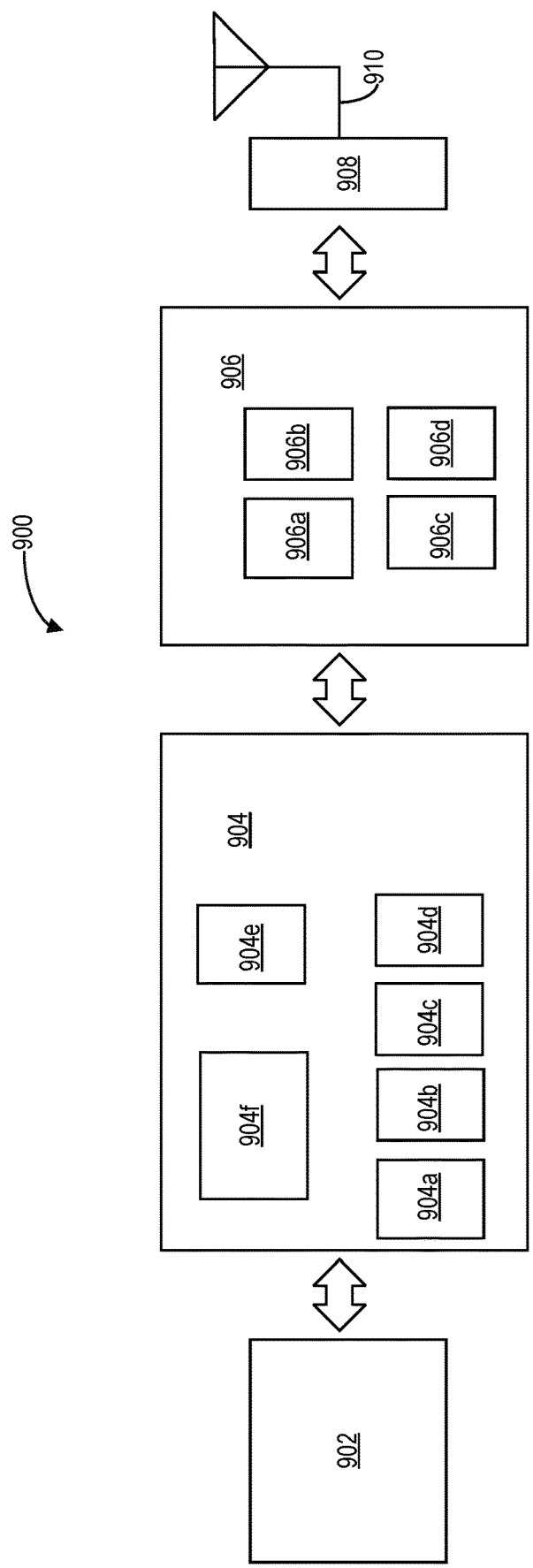
FIG. 9 is a diagram of example components of a wireless device such as a User Equipment (UE) device in accordance with one or more embodiments.

Referring now to FIG. 9, example components of a wireless device such as User Equipment (UE) device 900 in accordance with one or more embodiments will be discussed. In some embodiments, UE device 900 may include application circuitry 902, baseband circuitry 904, Radio Frequency (RF) circuitry 906, front-end module (FEM) circuitry 908 and one or more antennas 910, coupled together at least as shown.

Application circuitry 902 may include one or more application processors. For example, application circuitry 902 may include circuitry such as, but not limited to, one or more single-core or multi-core processors. The one or more processors may include any combination of general-purpose processors and dedicated processors, for example graphics processors, application processors, and so on. The processors may be coupled with and/or may include memory and/or storage and may be configured to execute instructions stored in the memory and/or storage to enable various applications and/or operating systems to run on the system.

Baseband circuitry 904 may include circuitry such as, but not limited to, one or more single-core or multi-core processors. Baseband circuitry 104 may include one or more baseband processors and/or control logic to process baseband signals received from a receive signal path of RF circuitry 906 and to generate baseband signals for a transmit signal path of the RF circuitry 906. Baseband processing circuitry 904 may interface with the application circuitry 902 for generation and processing of the baseband signals and for controlling operations of the RF circuitry 906. For example, in some embodiments, the baseband circuitry 904 may include a second generation (2G) baseband processor 904a, third generation (3G) baseband processor 904b, fourth generation (4G) baseband processor 904c, and/or one or more other baseband processors 904d for other existing generations, generations in development or to be developed in the future, for example fifth generation (5G), sixth generation (6G), and so on. Baseband circuitry 904, for example one or more of baseband processors 904a through 904d, may handle various radio control functions that enable communication with one or more radio networks via RF circuitry 906. The radio control functions may include, but are not limited to, signal modulation and/or demodulation, encoding and/or decoding, radio frequency shifting, and so on. In some embodiments, modulation and/or demodulation circuitry of baseband circuitry 904 may include Fast-Fourier Transform (FFT), precoding, and/or constellation mapping and/or demapping functionality. In some embodiments, encoding and/or decoding circuitry of baseband circuitry 904 may include convolution, tail-biting convolution, turbo, Viterbi, and/or Low Density Parity Check (LDPC) encoder and/or decoder functionality. Embodiments of modulation and/or demodulation and encoder and/or decoder functionality are not limited to these examples and may include other suitable functionality in other embodiments.

In some embodiments, baseband circuitry 904 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. Processor 904e of the baseband circuitry 904 may be configured to run elements of the protocol stack for signaling of the PHY, MAC, RLC, PDCP and/or RRC layers. In some embodiments, the baseband circuitry may include one or more audio digital signal processors (DSP) 904f. The one or more audio DSPs 904f may include elements for compression and/or decompression and/or echo cancellation and may include other suitable processing elements in other embodiments. Components of the baseband circuitry may be suitably combined in a single chip, a single chipset, or disposed on a same circuit board in some embodiments. In some embodiments, some or all of the constituent components of baseband circuitry 904 and application circuitry 902 may be implemented together such as, for example, on a system on a chip (SOC).

In some embodiments, baseband circuitry 904 may provide for communication compatible with one or more radio technologies. For example, in some embodiments, baseband circuitry 904 may support communication with an evolved universal terrestrial radio access network (EUTRAN) and/or other wireless metropolitan area networks (WMAN), a wireless local area network (WLAN), a wireless personal area network (WPAN). Embodiments in which baseband circuitry 904 is configured to support radio communications of more than one wireless protocol may be referred to as multi-mode baseband circuitry.

RF circuitry 906 may enable communication with wireless networks using modulated electromagnetic radiation through a non-solid medium. In various embodiments, RF circuitry 906 may include switches, filters, amplifiers, and so on, to facilitate the communication with the wireless network. RF circuitry 906 may include a receive signal path which may include circuitry to down-convert RF signals received from FEM circuitry 908 and provide baseband signals to baseband circuitry 904. RF circuitry 906 may also include a transmit signal path which may include circuitry to up-convert baseband signals provided by the baseband circuitry 904 and provide RF output signals to FEM circuitry 908 for transmission.

In some embodiments, RF circuitry 906 may include a receive signal path and a transmit signal path. The receive signal path of RF circuitry 906 may include mixer circuitry 906a, amplifier circuitry 906b and filter circuitry 906c. The transmit signal path of RF circuitry 906 may include filter circuitry 906c and mixer circuitry 906a. RF circuitry 906 may also include synthesizer circuitry 906d for synthesizing a frequency for use by the mixer circuitry 106a of the receive signal path and the transmit signal path. In some embodiments, the mixer circuitry 906a of the receive signal path may be configured to down-convert RF signals received from FEM circuitry 908 based on the synthesized frequency provided by synthesizer circuitry 1906d. Amplifier circuitry 906b may be configured to amplify the down-converted signals and the filter circuitry 906c may be a low-pass filter (LPF) or band-pass filter (BPF) configured to remove unwanted signals from the down-converted signals to generate output baseband signals. Output baseband signals may be provided to baseband circuitry 904 for further processing. In some embodiments, the output baseband signals may be zero-frequency baseband signals, although this is not a requirement. In some embodiments, mixer circuitry 906a of the receive signal path may comprise passive mixers, although the scope of the embodiments is not limited in this respect.

In some embodiments, mixer circuitry 906a of the transmit signal path may be configured to up-convert input baseband signals based on the synthesized frequency provided by synthesizer circuitry 906d to generate RF output signals for FEM circuitry 908. The baseband signals may be provided by the baseband circuitry 904 and may be filtered by filter circuitry 906c. Filter circuitry 906c may include a low-pass filter (LPF), although the scope of the embodiments is not limited in this respect.

In some embodiments, mixer circuitry 906a of the receive signal path and the mixer circuitry 906a of the transmit signal path may include two or more mixers and may be arranged for quadrature down conversion and/or up conversion respectively. In some embodiments, mixer circuitry 906a of the receive signal path and the mixer circuitry 906a of the transmit signal path may include two or more mixers and may be arranged for image rejection, for example Hartley image rejection. In some embodiments, mixer circuitry 906a of the receive signal path and the mixer circuitry 906a may be arranged for direct down conversion and/or direct up conversion, respectively. In some embodiments, mixer circuitry 906a of the receive signal path and mixer circuitry 906a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, RF circuitry 906 may include analog-to-digital converter (ADC) and digital-to-analog converter (DAC) circuitry, and baseband circuitry 904 may include a digital baseband interface to communicate with RF circuitry 906. In some dual-mode embodiments, separate radio integrated circuit (IC) circuitry may be provided for processing signals for one or more spectra, although the scope of the embodiments is not limited in this respect.

In some embodiments, synthesizer circuitry 906d may be a fractional-N synthesizer or a fractional N/N+1 synthesizer, although the scope of the embodiments is not limited in this respect as other types of frequency synthesizers may be suitable. For example, synthesizer circuitry 906d may be a delta-sigma synthesizer, a frequency multiplier, or a synthesizer comprising a phase-locked loop with a frequency divider.

Synthesizer circuitry 106d may be configured to synthesize an output frequency for use by mixer circuitry 906a of RF circuitry 906 based on a frequency input and a divider control input. In some embodiments, synthesizer circuitry 906d may be a fractional N/N+1 synthesizer.

In some embodiments, frequency input may be provided by a voltage controlled oscillator (VCO), although that is not a requirement. Divider control input may be provided by either baseband circuitry 904 or applications processor 902 depending on the desired output frequency. In some embodiments, a divider control input (e.g., N) may be determined from a look-up table based on a channel indicated by applications processor 902.

Synthesizer circuitry 906d of RF circuitry 906 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1, for example based on a carry out, to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 906d may be configured to generate a carrier frequency as the output frequency, while in other embodiments, the output frequency may be a multiple of the carrier frequency, for example twice the carrier frequency, four times the carrier frequency, and so on, and used in conjunction with quadrature generator and divider circuitry to generate multiple signals at the carrier frequency with multiple different phases with respect to each other. In some embodiments, the output frequency may be a local oscillator (LO) frequency (fLO). In some embodiments, RF circuitry 906 may include an in-phase and quadrature (IQ) and/or polar converter.

FEM circuitry 908 may include a receive signal path which may include circuitry configured to operate on RF signals received from one or more antennas 910, amplify the received signals and provide the amplified versions of the received signals to the RF circuitry 906 for further processing. FEM circuitry 908 may also include a transmit signal path which may include circuitry configured to amplify signals for transmission provided by RF circuitry 906 for transmission by one or more of the one or more antennas 910.

In some embodiments, FEM circuitry 908 may include a transmit/receive (TX/RX) switch to switch between transmit mode and receive mode operation. FEM circuitry 908 may include a receive signal path and a transmit signal path. The receive signal path of FEM circuitry 908 may include a low-noise amplifier (LNA) to amplify received RF signals and to provide the amplified received RF signals as an output, for example to RF circuitry 906. The transmit signal path of FEM circuitry 908 may include a power amplifier (PA) to amplify input RF signals, for example provided by RF circuitry 906, and one or more filters to generate RF signals for subsequent transmission, for example by one or more of antennas 910. In some embodiments, UE device 900 may include additional elements such as, for example, memory and/or storage, display, camera, sensor, and/or input/output (I/O) interface, although the scope of the claimed subject matter is not limited in this respect.

In a first example, an information handling system to manage resources in a network having a mobility management entity (MME) pool to perform load balancing comprises circuitry configured to receive performance measurements for at least one MME in the MME pool, if at least one of the performance measurements exceeds at least one predetermined threshold, request to instantiate a new mobility management entity virtual network function (MME VNF), instantiate the MME VNF in response to the request, and connect one or more user equipment (UE) devices managed by the MME pool to the added MME VNF.

In a second example, an information handling system to manage resources in a network having a mobility management entity (MME) pool to perform load balancing comprises circuitry configured to receive performance measurements of an MME virtual network function (MME VNF), if at least one of the performance measurements exceeds at least one predetermined threshold, send a request to scale out a new MME VNF, instantiate the new MME VNF in response to the request, and connect one or more user equipment (UE) devices managed by the MME pool to the new MME VNF.

In a third example, an information handling system to manage resources in a network having a mobility management entity (MME) pool comprises circuitry configured to receive performance measurements of an MME virtual network function (MME VNF), if at least one of the performance measurements exceeds at least one predetermined threshold, send a request to scale up MME VNF resources, increase the MME VNF resources in response to the request, and update one or more user equipment (UE) devices managed by the MME pool with a new weight factor according to the increased MME VNF resources.

In a fourth example, an information handling system to manage resources in a network having a mobility management entity (MME) pool to perform load balancing comprises circuitry configured to receive performance measurements of an MME virtual network function (MME VNF), if at least one of the performance measurements is below at least one predetermined threshold, send a request to scale in the MME VNF, offload one or more user equipment (UE) devices managed by the MME pool to a different MME VNF, and terminate the MME VNF to be scaled in.

In a fifth example, an information handling system to manage resources in a network having a mobility management entity (MME) pool comprises circuitry configured to receive performance measurements of an MME virtual network function (MME VNF), if at least one of the performance measurements is below at least one predetermined threshold, send a request to scale down MME VNF resources, decrease the MME VNF resources in response to the request, and update one or more user equipment (UE) devices managed by the MME pool with a new weight factor according to the increased MME VNF resources.

In a sixth example, a method to manage resources in a network having a mobility management entity (MME) pool to perform load balancing comprises receiving performance measurements for at least one MME in the MME pool, if at least one of the performance measurements exceeds at least one predetermined threshold, requesting to instantiate a new mobility management entity virtual network function (MME VNF), instantiating the MME VNF in response to the request, and connecting one or more user equipment (UE) devices managed by the MME pool to the added MME VNF.

In a seventh example, a method to manage resources in a network having a mobility management entity (MME) pool to perform load balancing comprises receiving performance measurements of an MME virtual network function (MME VNF), if at least one of the performance measurements exceeds at least one predetermined threshold, sending a request to scale out a new MME VNF, instantiating the new MME VNF in response to the request, and connecting one or more user equipment (UE) devices managed by the MME pool to the new MME VNF.

In an eighth example, a method to manage resources in a network having a mobility management entity (MME) pool comprises receiving performance measurements of an MME virtual network function (MME VNF), if at least one of the performance measurements exceeds at least one predetermined threshold, sending a request to scale up MME VNF resources, increasing the MME VNF resources in response to the request, and updating one or more user equipment (UE) devices managed by the MME pool with a new weight factor according to the increased MME VNF resources.

In a ninth example, a method to manage resources in a network having a mobility management entity (MME) pool to perform load balancing comprises receiving performance measurements of an MME virtual network function (MME VNF), if at least one of the performance measurements is below at least one predetermined threshold, sending a request to scale in the MME VNF, offloading one or more user equipment (UE) devices managed by the MME pool to a different MME VNF, and terminating the MME VNF to be scaled in.

In a tenth example, a method to manage resources in a network having a mobility management entity (MME) pool comprises receiving performance measurements of an MME virtual network function (MME VNF), if at least one of the performance measurements is below at least one predetermined threshold, sending a request to scale down MME VNF resources, decreasing the MME VNF resources in response to the request, and updating one or more user equipment (UE) devices managed by the MME pool with a new weight factor according to the increased MME VNF resources.

In an eleventh example, an article of manufacture comprising a non-transitory storage medium having instructions stored thereon to manage resources in a network having a mobility management entity (MME) pool to perform load balancing, wherein the instructions, if executed, result in receiving performance measurements for at least one MME in the MME pool, if at least one of the performance measurements exceeds at least one predetermined threshold, requesting to instantiate a new mobility management entity virtual network function (MME VNF), instantiating the MME VNF in response to the request, and connecting one or more user equipment (UE) devices managed by the MME pool to the added MME VNF.

In a twelfth example, an article of manufacture comprising a non-transitory storage medium having instructions stored thereon to manage resources in a network having a mobility management entity (MME) pool to perform load balancing, wherein the instructions, if executed, result in receiving performance measurements of an MME virtual network function (MME VNF), if at least one of the performance measurements exceeds at least one predetermined threshold, sending a request to scale out a new MME VNF, instantiating the new MME VNF in response to the request, and connecting one or more user equipment (UE) devices managed by the MME pool to the new MME VNF.

In a thirteenth example, an article of manufacture comprising a non-transitory storage medium having instructions stored thereon to manage resources in a network having a mobility management entity (MME) pool to perform load balancing, wherein the instructions, if executed, result in receiving performance measurements of an MME virtual network function (MME VNF), if at least one of the performance measurements exceeds at least one predetermined threshold, sending a request to scale up MME VNF resources, increasing the MME VNF resources in response to the request, and updating one or more user equipment (UE) devices managed by the MME pool with a new weight factor according to the increased MME VNF resources.

In a fourteenth example, an article of manufacture comprising a non-transitory storage medium having instructions stored thereon to manage resources in a network having a mobility management entity (MME) pool to perform load balancing, wherein the instructions, if executed, result in receiving performance measurements of an MME virtual network function (MME VNF), if at least one of the performance measurements is below at least one predetermined threshold, sending a request to scale in the MME VNF, offloading one or more user equipment (UE) devices managed by the MME pool to a different MME VNF, and terminating the MME VNF to be scaled in.

In a fifteenth example, an article of manufacture comprising a non-transitory storage medium having instructions stored thereon to manage resources in a network having a mobility management entity (MME) pool to perform load balancing, wherein the instructions, if executed, result in receiving performance measurements of an MME virtual network function (MME VNF), if at least one of the performance measurements is below at least one predetermined threshold, sending a request to scale down MME VNF resources, decreasing the MME VNF resources in response to the request, and updating one or more user equipment (UE) devices managed by the MME pool with a new weight factor according to the increased MME VNF resources.

In some of the above examples, the following further examples may apply. The performance measurements are received from a monitor function in the at least one MME. The performance measurements comprise MME processor usage, the circuitry being further configured to allocate additional computing or storing resources, or a combination thereof, if an MME processor usage counter exceeds a threshold value. The performance measurements comprise S1-MME data volume, and the circuitry is further configured to add networking capacity if an S1-MME data counter exceeds a threshold value. The performance measurements are received by a network manager (NM) for the network, and the NM determines if at least one of the performance measurements exceeds at least one predetermined threshold. The performance measurements are received by a network manager (NM) for the network, the NM forwards the load measurements to a network virtual functions orchestrator (NFV orchestrator), and the NFV orchestrator determines if at least one of the performance measurements exceeds at least one predetermined threshold. The performance measurements are received by a VNF manager for the network, and the VNF manager determines if at least one of the performance measurements exceeds at least one predetermined threshold. The performance measurements are received by a VNF manager for the network, the VNF manager forwards the load measurements to a network virtual functions orchestrator (NFV orchestrator), and the NFV orchestrator determines if at least one of the performance measurements exceeds at least one predetermined threshold. The performance measurements are received by an element manager for the network, and the element manager determines if at least one of the performance measurements exceeds at least one predetermined threshold. The performance measurements are received by an element manager for the network, the element manager forwards the load measurements to a network virtual functions orchestrator (NFV orchestrator), via VNFM, and the NFV orchestrator determines if at least one of the performance measurements exceeds at least one predetermined threshold. The MME pool comprises at least one physical MME network element, and said connecting comprises rebalancing one or more UEs from the physical MME network element to the MME VNF. The circuitry is further configured to terminate the MME VNF if at least one of the performance measurements falls below at least one predetermined threshold.

In some of the above examples, the following further examples may apply. The performance measurements are received from a monitor function in the at least one MME VNF. The performance measurements comprise MME processor usage, and the circuitry is further configured to remove computing or storing resources, or a combination thereof, if an MME processor usage counter is below a threshold value. The load measurements comprise S1-MME data volume, and the circuitry is further configured to remove networking capacity if an S1-MME data counter is below a threshold value. The performance measurements are received by a network manager (NM) for the network, and the NM determines if the least one of the performance measurements is below at least one predetermined threshold. The performance measurements are received by a network manager (NM) for the network, the NM forwards the load measurements to a network virtual functions orchestrator (NVF orchestrator), and the NFV orchestrator determines if the least one of the performance measurements is below at least one predetermined threshold. The performance measurements are received by a VNF manager for the network, and the VNF manager determines if at least one of the performance measurements is below at least one predetermined threshold. The performance measurements are received by a VNF manager for the network, the VNF manager forwards the load measurements to a network virtual functions orchestrator (NVF orchestrator), and the NFV orchestrator determines if at least one of the performance measurements is below at least one predetermined threshold. The performance measurements are received by an element manager for the network, and the element manager determines if at least one of the performance measurements is below at least one predetermined threshold. The performance measurements are received by an element manager for the network, the element manager forwards the load measurements to a network virtual functions orchestrator (NVF orchestrator), and the NFV orchestrator determines if at least one of the performance measurements is below at least one predetermined threshold.

Although the claimed subject matter has been described with a certain degree of particularity, it should be recognized that elements thereof may be altered by persons skilled in the art without departing from the spirit and/or scope of claimed subject matter. It is believed that the subject matter pertaining to virtualized network function management and many of its attendant utilities will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. An information handling system to manage resources in a network having a mobility management entity (MME) pool to perform load balancing, comprising circuitry configured to:
   receive performance measurements for at least one MME in the MME pool, wherein the performance measurements are received by a network manager (NM) for the network, VNF manager for the network, or an element manager for the network;
   forward the performance measurements from a network functions virtualization network manager (NFV NM) to a network virtual functions orchestrator (NFV orchestrator) to allow the NFV orchestrator to determine if at least one of the performance measurements exceeds at least one predetermined threshold;
   if the NFV orchestrator determines that at least one of the performance measurements exceeds at least one predetermined threshold, receive a request from the NFV orchestrator to instantiate a new mobility management entity virtual network function (MME VNF);
   instantiate the new MME VNF in response to the request; and
   connect one or more user equipment (UE) devices managed by the MME pool to the new MME VNF.

2. The information handling system as claimed in claim 1, wherein the performance measurements comprise MME processor usage or S1-MME data volume, the circuitry being further configured to allocate additional computing or storing resources, or a combination thereof, if an MME processor usage counter or an S1-MME data counter exceeds a threshold value.

3. The information handling system as claimed in claim 1, wherein the MME pool comprises at least one physical MME network element, and the circuitry is further configured to rebalance one or more UEs from the physical MME network element to the MME VNF.

4. The information handling system as claimed in claim 1, wherein the circuitry is further configured to terminate the MME VNF if at least one of the performance measurements falls below at least one predetermined threshold.

5. An information handling system to manage resources in a network having a mobility management entity (MME) pool to perform load balancing, comprising circuitry configured to:
   receive performance measurements for at least one MME in the MME pool, wherein the performance measurements are received by a network manager (NM) for the network, VNF manager for the network, or an element manager for the network;
   forward the performance measurements from a network functions virtualization network manager (NFV NM) to a network virtual functions orchestrator (NFV orchestrator) to allow the NFV orchestrator to determine if at least one of the performance measurements exceeds at least one predetermined threshold;
   if the NFV orchestrator determines that at least one of the performance measurements exceeds at least one predetermined threshold, send a request to scale out a new MME VNF;
   instantiate the new MME VNF in response to the request; and
   connect one or more user equipment (UE) devices managed by the MME pool to the new MME VNF.

6. The information handling system as claimed in claim 5, wherein the performance measurements comprise MME processor usage or S1-MME data volume, the circuitry being further configured to allocate additional computing or storing resources, or a combination thereof, if an MME processor usage counter or an S1-MME data counter exceeds a threshold value.

7. The information handling system as claimed in claim 5, wherein the MME pool comprises at least one physical MME network element, and the circuitry is further configured to rebalance one or more UEs from the physical MME network element to the MME VNF.

8. The information handling system as claimed in claim 5, wherein the circuitry is further configured to:
   send a request to scale in the MME VNF if at least one of the performance measurements is below at least one predetermined threshold;
   offload one or more user equipment (UE) devices managed by the MME pool to a different MME VNF; and
   terminate the MME VNF to be scaled in.

9. An article of manufacture comprising a non-transitory storage medium having instructions stored thereon to manage resources in a network having a mobility management entity (MME) pool to perform load balancing, wherein the instructions, if executed by a processor, result in:
   receive performance measurements for at least one MME in the MME pool, wherein the performance measurements are received by a network manager (NM) for the network, VNF manager for the network, or an element manager for the network;
   forwarding the performance measurements from a network functions virtualization network manager (NFV NM) to a network virtual functions orchestrator (NFV orchestrator) to allow the NFV orchestrator to determine if at least one of the performance measurements exceeds at least one predetermined threshold;
   if the NFV orchestrator determines that at least one of the performance measurements exceeds at least one predetermined threshold, requesting to instantiate a new mobility management entity virtual network function (MME VNF);
   instantiating the MME VNF in response to the request; and
   connecting one or more user equipment (UE) devices managed by the MME pool to the added MME VNF.

10. The article of manufacture as claimed in claim 9, wherein the performance measurements comprise MME processor usage or S1-MME data volume, the instructions further resulting in allocating additional computing or storing resources, or a combination thereof, if an MME processor usage counter or an S1-MME data counter exceeds a threshold value.

11. The article of manufacture as claimed in claim 9, wherein the MME pool comprises at least one physical MME network element, and the method further comprises rebalancing one or more UEs from the physical MME network element to the MME VNF.

12. The article of manufacture as claimed in claim 9, wherein the instructions, if executed, further result in terminating the MME VNF if at least one of the performance measurements falls below at least one predetermined threshold.

13. An article of manufacture comprising a non-transitory storage medium having instructions stored thereon to manage resources in a network having a mobility management entity (MME) pool to perform load balancing, wherein the instructions, if executed by a processor, result in:
   receive performance measurements for at least one MME in the MME pool, wherein the performance measurements are received by a network manager (NM) for the network, VNF manager for the network, or an element manager for the network;
   forwarding the performance measurements from a network functions virtualization network manager (NFV NM) to a network virtual functions orchestrator (NFV orchestrator) to allow the NFV orchestrator to determine if at least one of the performance measurements exceeds at least one predetermined threshold;
   if the NFV orchestrator determines at least one of the performance measurements exceeds at least one predetermined threshold, sending a request to scale out a new MME VNF;
   instantiating the new MME VNF in response to the request; and
   connecting one or more user equipment (UE) devices managed by the MME pool to the new MME VNF.

14. The article of manufacture as claimed in claim 13, wherein the performance measurements comprise MME processor usage or S1-MME data volume, the instructions further resulting in allocating additional computing or storing resources, or a combination thereof, if an MME processor usage counter or an S1-MME data counter exceeds a threshold value.

* * * * *